Feb. 3, 1959 E. D. WILKERSON 2,871,988
BICYCLE BRAKING SYSTEM
Filed March 9, 1955 2 Sheets-Sheet 1
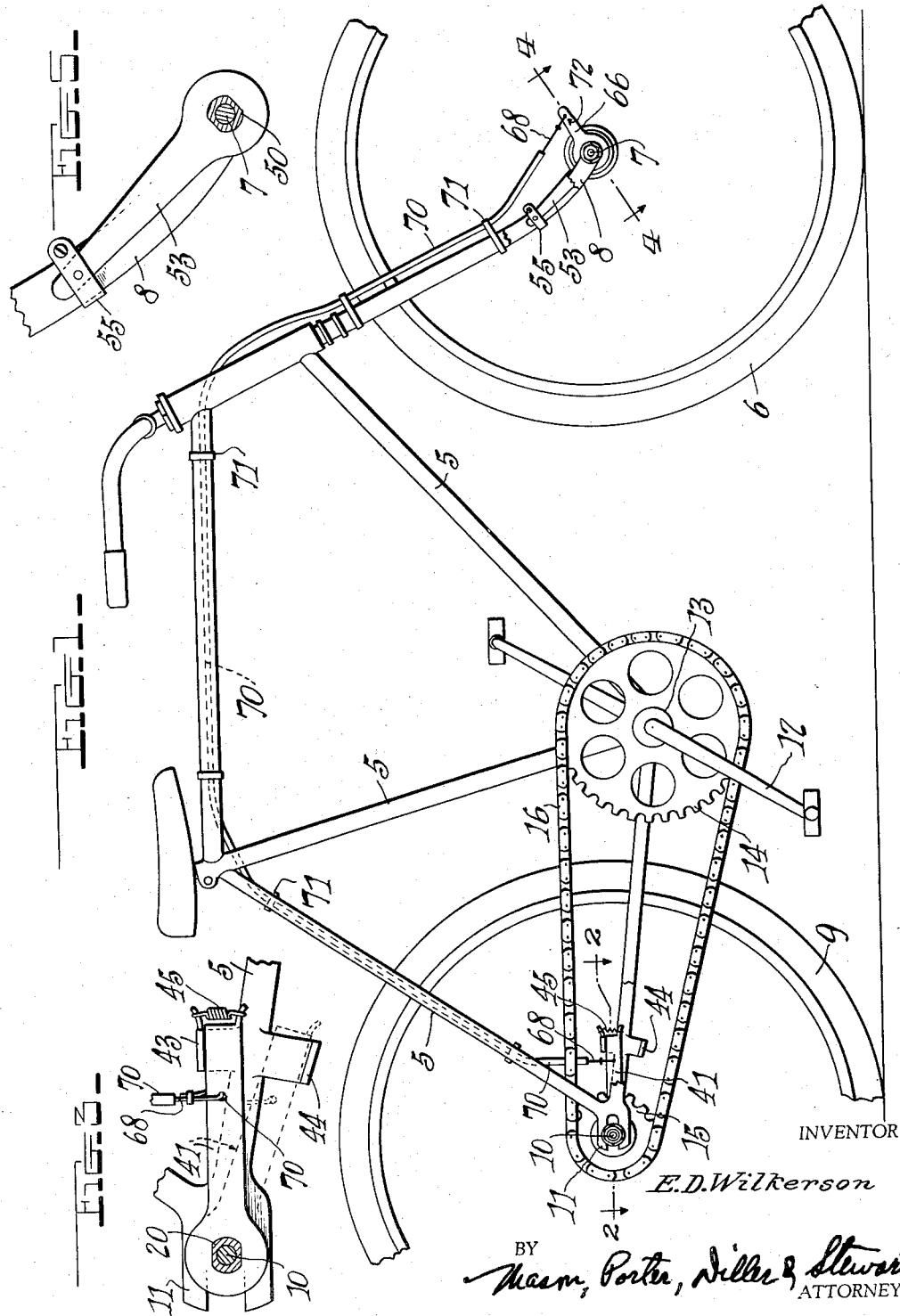
INVENTOR
E. D. Wilkerson
BY Mason, Porter, Diller & Stewart
ATTORNEYS Feb. 3, 1959     E. D. WILKERSON     2,871,988
BICYCLE BRAKING SYSTEM
Filed March 9, 1955     2 Sheets-Sheet 2
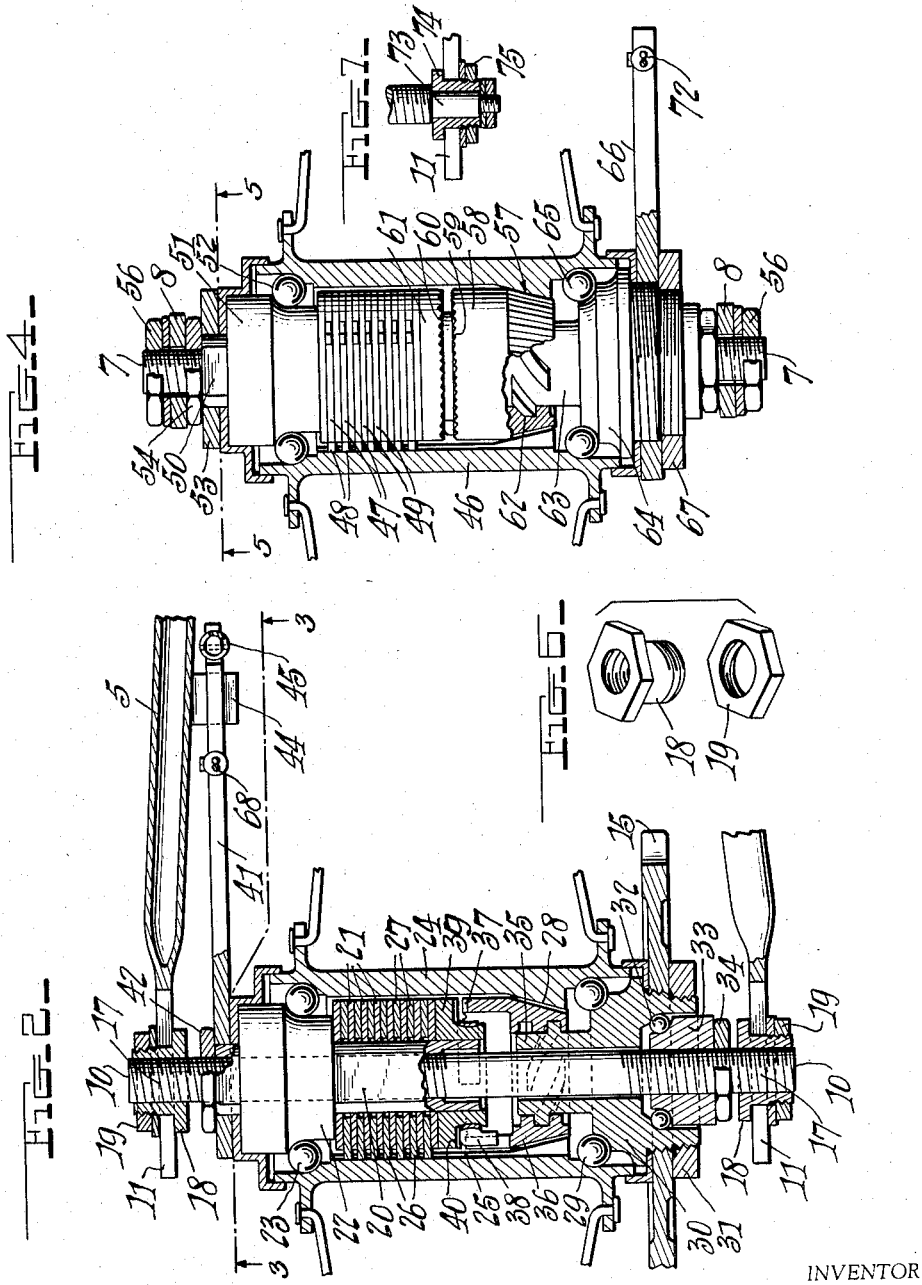
INVENTOR
E. D. Wilkerson
BY
ATTORNEYS

United States Patent Office 2,871,988
Patented Feb. 3, 1959

2,871,988
BICYCLE BRAKING SYSTEM

Edward D. Wilkerson, Livingston, N. J.

Application March 9, 1955, Serial No. 493,105

8 Claims. (Cl. 188—26)

The invention relates generally to braking means and primarily seeks to provide a novel braking system for use on bicycles and which is capable of applying a braking action at the front wheel as well as at the rear wheel of a bicycle on which the system is installed.

An object of the invention is to provide a braking system of the character stated wherein are included a braking means applicable to the front wheel of a bicycle, a braking means applicable to the rear wheel of the bicycle, means for actuating the rear wheel braking means, and means for utilizing energy developed in the application of the rear wheel braking means for actuating the front wheel braking means.

Another object of the invention is to provide a braking system of the character stated wherein the front wheel braking means includes a member shiftable to bring about a braking action of the front wheel braking means. The rear wheel braking means includes a member shiftable each time the rear wheel braking means is actuated to apply a braking action at the rear wheel, and there is included means for transmitting movement from the last mentioned shiftable member to the first mentioned shiftable member so that each application of the rear wheel braking means will cause a braking action to be applied at the front wheel.

A further object of the invention is to provide a braking system of the character stated wherein the transmitting of energy from a braking action being applied at a rear wheel, to bring about an actuation of the braking means applicable to the front wheel for braking the latter, will be effective only so long as the rear wheel braking means remains applied to the rear wheel and the rear wheel remains in contact with the ground, thereby to assure a releasing of the front wheel braking action each time there is any tendency of the rear wheel to leave the ground and flip over the front wheel.

A still further object of the invention is to provide a braking system of the character stated wherein the braking action at the rear wheel is initiated by a back pedalling action of the rider, and wherein the brake means applying actuator movement at the front wheel is applied through reaction torque incidental to brake application at the rear wheel.

With the above and other objects in view that will hereinafter appear, the nature of the invention will be more clearly understood by reference to the following detailed description, the appended claims and the several views illustrated in the accompanying drawings.

In the drawings:

Figure 1 is a side elevation illustrating a bicycle with the invention incorporated therein.

Figure 2 is an enlarged horizontal section taken on the line 2—2 on Figure 1 and illustrating the rear wheel braking means.

Figure 3 is a fragmentary vertical cross section taken on the line 3—3 on Figure 2.

Figure 4 is an enlarged fragmentary sectional view taken on the line 4—4 on Figure 1 and illustrating the front braking means.

Figure 5 is a fragmentary vertical cross section taken on the line 5—5 of Figure 4.

Figure 6 is an exploded perspective view illustrating the sleeve abutment screw and nut employed in securing one end of the rear axle in a frame fork.

Figure 7 is a detailed sectional view illustrating a modified form of mounting for the rear axle.

In the herein disclosed example embodiment of the invention the novel front and rear wheel brake system is shown as incorporated in a bicycle including the usual frame structure generally designated 5, the front wheel 6 being shown as mounted on an axle 7 in the front forks 8, and the rear wheel 9 being shown as mounted on the axle 10 in the rear forks 11.

In the conventional manner the pedal equipped crank 12, rotatable in the crank hanger 13 serves to impart rotation to the driver sprocket 14 which in turn drives the driven sprocket 15 of the rear wheel assembly through the usual chain 16.

The rear wheel assembly is shown as including a standard coaster brake structure, and the rear axle 10 is shown as threaded at 17 therethrough and turnable slightly in sleeve abutment screws 18 opposed by securing nuts 19 for securing the ends of the axle in the rear forks 11 in the manner clearly illustrated in Figures 1 and 2. A flatted sleeve 20 is threaded onto the rear axle 10, and alternated brake disks 21 surround the sleeve and have complementary openings to be held against rotation on the sleeve by reason of the engagement thereof with the flatted portion of the sleeve. The sleeve 20 carries one bearing cone 22 of the rear wheel assembly, ball bearings 23 being interposed in the usual manner between the cone 22 and the wheel hub 24.

The wheel hub is provided with longitudinal key slot means 25 internally thereof in which to receive lugs 26 projecting radially from brake disks 27 intervening the alternated brake disks 21 in the manner clearly illustrated in Figure 2. The hub 24 also is equipped with an internally presented cone surface 28 the purpose of which will be described hereinafter.

At its other end the rear wheel hub 24 is mounted on ball bearings 29 about a second bearing cone 30 which freely surounds the axle 10 and is secured at 31 to the driven sprocket 15. The second bearing cone 30 is rotatable on ball bearings 32 about a cone 33 threaded onto the axle 10 and secured thereon by the jam nut 34. The cone 30 has an externally threaded sleeve 35 extending therefrom and threaded in the cone sleeve 36. The cone sleeve 36 is equipped with a clutch face 37 at the end thereof directed toward the brake disks and is friction keyed at 38 to a clutch ring 39 mounted on the sleeve 20 and also having a clutch face 40 opposing the previously described clutch face 37. It will be apparent by reference to Figure 2 that whenever the cone sleeve 36 is moved longitudinally and toward the brake disks the opposing clutch faces 37 and 40 will first engage and then the brake disk sets 21 and 27 will be forced into intimate, rear wheel brake applying contact.

A crank arm 41 is secured at 42 on the flatted sleeve 20 and has its free end swingable between upper and lower stops illustrated in detail in Figures 1 and 3 and designated 43 and 44, respectively. It will be apparent by reference to Figure 3 that the upper and lower stops 43 and 44 are spaced so as to permit a limited amount of oscillation of the crank arm 41, and a retractile spring 45 anchored to the stop 43 and to the free end of the crank arm constantly tends to hold the crank arm against the stop 43, as illustrated in full lines in Figure 3.

A braking assembly similar to that just described in connection with the rear wheel may be included in the front wheel assembly, and this front wheel brakinge assembly is best illustrated in Figures 1, 4 and 5 of the drawings. This assembly includes the front wheel hub 46 with the alternated brake disks 47 keyed thereto at 48, and the other set of intervening disks 49 carried in the manner previously described on a flatted sleeve 50. As in the case of the rear braking means the flatted sleeve 50 carries the bearing cone 51 which is surrounded by the ball bearings 52 within one end of the front wheel hub 46. The sleeve 50 has a reaction arm 53 secured thereon at 54 and extending radially in the manner clearly illustrated in Figures 1 and 5 to be secured at its free end at 55 to the front fork 8 of the bicycle frame structure.

The flatted sleeve 50 is mounted on the front axle 7 which is secured at 56 in the front forks 8. The front wheel hub 46 has a cone surface 57 presented interiorly thereof and which is opposed by the cone sleeve 58 having the clutch face 59 at the end thereof directed toward the braking disks. The sleeve clutch face 59 opposes a clutch face 60 on the clutch ring 61 engaging the brake disk pack. The cone sleeve 58 is threaded at 62 on the sleeve 63 extending from the cone 64 about which the other end of the wheel hub 46 rotates on ball bearings 65.

A crank arm 66 is secured at 67 to the cone 64 and the threaded sleeve 63 projecting endwise therefrom, and it will be apparent that as the crank arm 66 is oscillated it will impart oscillation to the threaded sleeve 63 and cause endwise movement of the cone sleeve 58 in one direction or the other according to the direction of oscillation of the crank arm.

A cable or wire 68 is anchored at 68a to the crank arm 41 of the rear braking means assembly and passes through a sheathing tube 70 anchored at intervals as at 71 on the bicycle framing. It will be apparent by reference to Figure 1 that the protective sheathing 70 extends forwardly over the bicyle framing to a point adjacent the front wheel braking means at which point the wire or cable 68 leaves the protective sheathing and is connected at 72 to the free end of the crank arm 66 of the front wheel braking means. It is to be understood that the desired limited amount of turning of the rear axle 10 can take place as a threading movement in the abutment screws 18 of the rear wheel mounting, or a modified axle mounting such as is illustrated in Figure 7 may be employed. In this modified arrangement the rear axle may inclue a reduced, non-threaded end portion 73 at each end thereof and turnable in a sleeve screw 74 mounted in the respective fork 11 and secured in position as at 75.

In the example disclosure a standard form of coaster brake is shown, and in this particular embodiment forward pedalling of the crank means 12 will cause the chain 16 to drive the sprocket 15 and impart rotation to the cone 30. By reason of the threaded connection of the cone sleeve 36 at 35 the cone sleeve will be drawn against the cone surface 28 so that the rotation of the sprocket 15 will be transmitted to the rear axle through the hub 24. Whenever the pedalling is discontinued, the threaded connection 35 will act to relieve active pressure contact of the cone sleeve 36 against the cone surface 28 of the hub 24 and the bicycle will be permitted to coast in the well known manner.

Whenever it is desired to apply the brakes the rider back pedals the crank means 12 to impart counterclockwise rotation to the sprocket 15 and the connected cone bearing 30. This back pedalling action and counterclockwise rotation of the sprocket and cone bearing 30 will act through the threaded connection at 35 to positively displace the cone sleeve 36 endwise to first cause the clutch faces 37 and 40 to engage, and then bring about friction contact between the disk sets 27 and 21 to apply a braking action to the rear wheel. The frictional contact of the braking disk sets will cause the crank arm 41 to swing from the full line position illustrated in Figure 3 to the dotted line position in said figure, and during this swinging movement the arm 41 will exert a pull on the wire or cable 68 which will be effective to bring about a front wheel braking action. As the crank arm 41 comes against the lower stop 44 its freedom to move with the rear wheel will be terminated and a full braking action at the wheel will follow. It will also be apparent that by utilizing the movement of the crank arm 41 in transmitting movement to the brake applying devices at the front wheel assembly, the application of the brakes at the front wheel can be said to be applied through reaction torque incidental to brake application at the rear wheel. Stated another way, energy is transmitted from the rear wheel braking means to the front brake applying means for applying the braking means to the front wheel while the braking means is being applied to the rear wheel.

As the pull is exerted on the wire or cable 68 by reason of the limited clockwise swinging movement of the crank arm 41 of the rear braking means it will exert a pull upwardly on the free end of the crank arm 66 of the front wheel braking means, as will be apparent by reference to Figure 1 of the drawing. This counterclockwise movement of the crank arm 66 will act through the threaded connection 62 with the sleeve 58 to move the sleeve to first bring the clutch faces 59 and 60 together and then force the braking disks 49, 47 together in effecting a braking action at the front wheel. This braking action will act in the well known manner against the arm 53 rigidly anchored at 55 to the front fork of the bicyle framing.

It will be apparent that the braking action applied at both rear and front wheels in the manner previously described will be effective only so long as the rear wheel braking means is held applied and the rear wheel remains in contact with the ground. Should the braking action be discontinued by relieving the back pedalling pressure, or should the rear wheel tend to leave the ground as a result of application of too great a braking action at the front wheel, or for any other reason, the rear braking means crank arm 41 will be returned to its full line position illustrated in Figure 3, the pull on the wire or cable 68 will thus be relaxed, and the application of the braking action at the front wheel will be discontinued. It will thus be apparent that the front wheel braking means will be released each time there is any tendency of the rear wheel to leave the ground and flip over the front wheel. However, should the rider hold the brake application at the rear wheel during a tendency of the rear wheel to leave the ground and tip over the front wheel, resumption of normal pressure of the rear wheel against the ground with the braking action applied thereto will again bring about a downward swinging of the crank arm 41 and a reapplication of the front wheel braking means.

While example disclosures of the invention are made therein in order to illustrate one operating assembly it is to be understood that the disclosed parts may be changed in construction and arrangement in various ways without departing from the spirit and scope of the invention as defined in the appended claims.

I claim:

1. In a bicycle wherein is provided a frame, a rear wheel rotatably mounted on the frame, a front wheel rotatably mounted on the frame, and pedal operated means for imparting rotation to the rear wheel for the purpose of propelling the bicycle, in combination, braking means for the front wheel and including a movable brake actuator, braking means for the rear wheel operable by back pedalling of the rotation imparting means for braking forward rotation of the rear wheel and including a movement imparting device movable with the rear wheel as the braking means is being applied to the rear wheel, and means for transmitting movement from said movement imparting device to said brake actuator to apply the front wheel braking means as the rear wheel braking means is being applied.

2. An apparatus for braking the front and rear wheels of a bicycle as defined in claim 1 wherein there are included means for coupling the movement imparting device with the rear wheel so as to be movable in the direction of rotation of the rear wheel as the rear wheel braking means is being applied thereto and the rear wheel is being turned by its engagement with the ground while the bicycle is moving forward thereby to be so movable with the rear wheel only so long as the rear wheel remains on the ground as the braking thereof is in progress, thereby to automatically discontinue said transmitting of movement to said brake actuator and the braking of the front wheel whenever the rear wheel leaves the ground and tends to flip over the front wheel as a result of excessive braking of the front wheel and tendency toward a shifting of the weight of a bicycle rider forwardly during a braking action.

3. An apparatus for braking the front and rear wheels of a bicycle as defined in claim 1 wherein there are included means for coupling the movement imparting device with the rear wheel so as to be movable in the direction of rotation of the rear wheel as the rear wheel braking means is being applied thereto and the rear wheel is being turned by its engagement with the ground while the bicycle is moving forward thereby to be so movable with the rear wheel only so long as the rear wheel remains on the ground as the braking thereof is in progress, thereby to automatically discontinue said transmitting of movement to said brake actuator and the braking of the front wheel whenever the rear wheel leaves the ground and tends to flip over the front wheel as a result of excessive braking of the front wheel and tendency toward a shifting of the weight of a bicycle rider forwardly during a braking action, said movement imparting device being again movable in the direction of rotation of the rear wheel each time release of braking action on the front wheel permits the rear wheel again to contact the ground and thus be rotated while braking action is retained thereon, thereby to again bring about actuation of the braking means for the front wheel.

4. An apparatus for braking the front and rear wheels of a bicycle as defined in claim 1 wherein the braking means for the rear wheel comprises, a hub rotatable with the rear wheel, brake disk means secured to the hub, a sleeve oscillatable within the hub, brake disk means engageable with the hub secured disk means and secured to the sleeve, a crank arm extending from the sleeve and constituting the movement imparting device of claim 1, cone surface means in the hub, sprocket means comprising a part of the pedal operated means of claim 1, and cone sleeve means threadably connected to the sprocket means and effective when the sprocket means is turned forward to move the cone sleeve against hub cone surface for driving the rear wheel and relieving the brake disk means from mutual braking contact and when said sprocket means is turned backward to move the cone sleeve away from the hub cone surface and endwise to force the brake disk means into mutual braking contact to apply a braking action to the rear wheel and cause movement of the crank arm in the direction of rotation of the rear wheel.

5. An apparatus for braking the front and rear wheels of a bicycle as defined in claim 1 wherein the braking means for the rear wheel comprises, a hub rotatable with the rear wheel, brake disk means secured to the hub, a sleeve oscillatable within the hub, brake disk means engageable with the hub secured disk means and secured to the sleeve, a crank arm extending from the sleeve and constituting the movement imparting device of claim 1, cone surface means in the hub sprocket means comprising a part of the pedal operated means of claim 1, and cone sleeve means threadably connected to the sprocket means and effective when the sprocket means is turned forward to move the cone sleeve against the hub cone surface for driving the rear wheel and relieving the brake disk means from mutual braking contact and when said sprocket means is turned backward to move the cone sleeve away from the hub cone surface and endwise to force the brake disk means into mutual braking contact to apply a braking action to the rear wheel and cause movement of the crank arm in the direction of rotation of the rear wheel, spaced stop means engageable by the crank arm and spaced to permit limited oscillation of the arm in a forward and backward direction, and spring means engaging the crank arm and constantly tending to hold the crank arm against the stop limiting movement in the backward direction counter to the direction of forward rear wheel rotation.

6. An apparatus for braking the front and rear wheels of a bicycle as defined in claim 1 wherein the braking means for the rear wheel comprises, a hub rotatable with the rear wheel, brake disk means secured to the hub, a sleeve oscillatable within the hub, brake disk means engageable with the hub secured disk means and secured to the sleeve, a crank arm extending from the sleeve and constituting the movement imparting device of claim 1, cone surface means in the hub, sprocket means comprising a part of the pedal operated means of claim 1, and cone sleeve means threadably connected to the sprocket means and effective when the sprocket means is turned forward to move the cone sleeve against hub cone surface for driving the rear wheel and relieving the brake disk means from mutual braking contact and when said sprocket means is turned backward to move the cone sleeve away from the hub cone surface and endwise to force the brake disk means into mutual braking contact to apply a braking action to the rear wheel and cause movement of the crank arm in the direction of rotation of the rear wheel, the movement transmitting means of claim 1 constituting a tension member connecting said crank arm with the movable brake actuator of the front wheel braking means.

7. An apparatus for braking the front and rear wheels of a bicycle as defined in claim 1 wherein the braking means for the front wheel comprises, a hub rotatable with the front wheel, brake disk means secured to the hub, a sleeve oscillatable within the hub, brake disk means engageable with the hub secured disk means and secured to the sleeve, means anchoring the sleeve to the frame to prevent rotation of the sleeve with the front wheel, the movable front wheel brake actuator of claim 1 comprising a crank arm oscillatable about the front wheel axis, and a thrust member threadably connected with the last mentioned crank arm and movable in a direction for forcing the disk means into brake applying contact when movement is transmitted to said last mentioned crank arm from the movement imparting device of claim 1.

8. An apparatus for braking the front and rear wheels of a bicycle as defined in claim 1 wherein the braking means for the rear wheel comprises, a hub rotatable with the rear wheel, brake disk means secured to the hub, a sleeve oscillatable within the hub, brake disk means engageable with the hub secured disk means and secured to the sleeve, a crank arm extending from the sleeve and constituting the movement imparting device of claim 1, cone surface means in the hub, sprocket means comprising a part of the pedal operated means of claim 1, and cone sleeve means threadably connected to the sprocket means and effective when the sprocket means is turned forward to move the cone sleeve against hub cone surface for driving the rear wheel and relieving the brake disk means from mutual braking contact and when said sprocket means is turned backward to move the cone sleeve away from the hub cone surface and endwise to force the brake disk means into mutual braking contact to apply a braking action to the rear wheel and cause movement of the crank arm in the direction of rotation of the rear wheel, the movement transmitting means of claim 1 constituting a tension member connecting said crank arm with the movable brake actuator of the front wheel braking means, and wherein the braking means for the front wheel comprises, a hub rotatable with the front wheel, brake disk means secured to the hub, a sleeve oscillatable within the hub, brake disk means engageable with the hub secured disk means and secured to the sleeve, means anchoring the sleeve to the frame to prevent rotation of the sleeve with the front wheel, the movable front wheel brake actuator of claim 1 comprising a crank arm oscillatable about the front wheel axis, and a thrust member threadably connected with the last mentioned crank arm and movable in a direction for forcing the disk means into brake applying contact when movement is transmitted to said last mentioned crank arm through said tension member.

References Cited in the file of this patent

UNITED STATES PATENTS

| | | |
|---|---|---|
| 624,285 | Zimmerman | May 2, 1899 |
| 662,602 | Schmidt et al. | Nov. 27, 1900 |
| 1,296,931 | Davis | Mar. 11, 1919 |
| 1,944,144 | Fortini | Jan. 16, 1934 |
| 2,054,583 | Delaval-Crow | Sept. 15, 1936 |
| 2,199,997 | Huges | May 7, 1940 |
| 2,751,046 | Tack | June 19, 1956 |

FOREIGN PATENTS

| | | |
|---|---|---|
| 465,393 | Great Britain | May 6, 1937 |